United States Patent
Fenny et al.

(10) Patent No.: US 11,548,617 B2
(45) Date of Patent: Jan. 10, 2023

(54) PITCH-CHANGE APPARATUS AND METHOD OF PITCHING ROTOR BLADES

(71) Applicant: Bell Helicopter Textron Inc., Fort Worth, TX (US)

(72) Inventors: Carlos Alexander Fenny, Fort Worth, TX (US); Nicholas Brodeur, Beaconsfield (CA); Louis Charron, St-Jerome (CA); Kevin Morris, Hawesbury (CA)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 16/439,055

(22) Filed: Jun. 12, 2019

(65) Prior Publication Data
US 2020/0391847 A1 Dec. 17, 2020

(51) Int. Cl.
| | | |
|---|---|---|
| *B64C 11/06* | (2006.01) | |
| *B64C 11/32* | (2006.01) | |
| *B64C 27/37* | (2006.01) | |
| *B64C 29/00* | (2006.01) | |
| *B64C 39/02* | (2006.01) | |

(52) U.S. Cl.
CPC .............. *B64C 11/06* (2013.01); *B64C 11/32* (2013.01); *B64C 27/37* (2013.01); *B64C 29/00* (2013.01); *B64C 39/024* (2013.01); *B64C 2201/108* (2013.01); *B64C 2201/165* (2013.01)

(58) Field of Classification Search
CPC ......... B64C 11/06; B64C 11/32; B64C 11/44; B64C 11/30; B64C 11/343; B64C 11/325; B64C 27/37; B64C 29/00; B64C 39/024; B64C 2201/108; B64C 2201/165; F01D 7/00; F04D 29/323; F04D 15/0055; F04D 29/366; F16D 15/00; F05D 2260/74
See application file for complete search history.

(56) References Cited

U.S. PATENT DOCUMENTS

| | | | | |
|---|---|---|---|---|
| 2,432,320 | A * | 12/1947 | Lilley | B64C 11/36 416/27 |
| 5,451,141 | A * | 9/1995 | Carvalho | B64C 11/44 416/152 |
| 8,167,553 | B2 * | 5/2012 | Perkinson | B64C 11/44 416/1 |
| 9,809,300 | B1 * | 11/2017 | Kuentzel | B64C 11/343 |
| 2003/0077173 | A1 * | 4/2003 | Franchet | B64C 11/38 416/30 |
| 2010/0290908 | A1 * | 11/2010 | Denniss | F03B 13/142 416/147 |
| 2016/0009373 | A1 | 1/2016 | Kondor et al. | |
| 2018/0002008 | A1 * | 1/2018 | Muren | B64C 27/51 |
| 2018/0066671 | A1 * | 3/2018 | Murugan | G06F 17/13 |

OTHER PUBLICATIONS

Marsh, Alton K.; "How it Works: Constant Speed Propeller A Prop For All Reasons;" Nov. 1, 2016; www.aopa.org/news-and-media/allnews/2016/november/flight-training/how-it-works-constant-speed-propeller; 3 pages.
Showstopper Precision Variable Pitch Prop System (EFLPVPP100); www.horizonhobby.com/shostopper-precision-variable-pitch-prop-system-eflpvpp100; accessed Jun. 11, 2019; 5 pages.
Canadian Exam Report in related Canadian Patent Application No. 3,083,284 dated Aug. 12, 2021, 4 pages.

* cited by examiner

*Primary Examiner* — Eric J Zamora Alvarez
(74) *Attorney, Agent, or Firm* — Lightfoot & Alford PLLC

(57) ABSTRACT

A method of pitching rotor blades by interrupting torque applied to the hub.

1 Claim, 21 Drawing Sheets

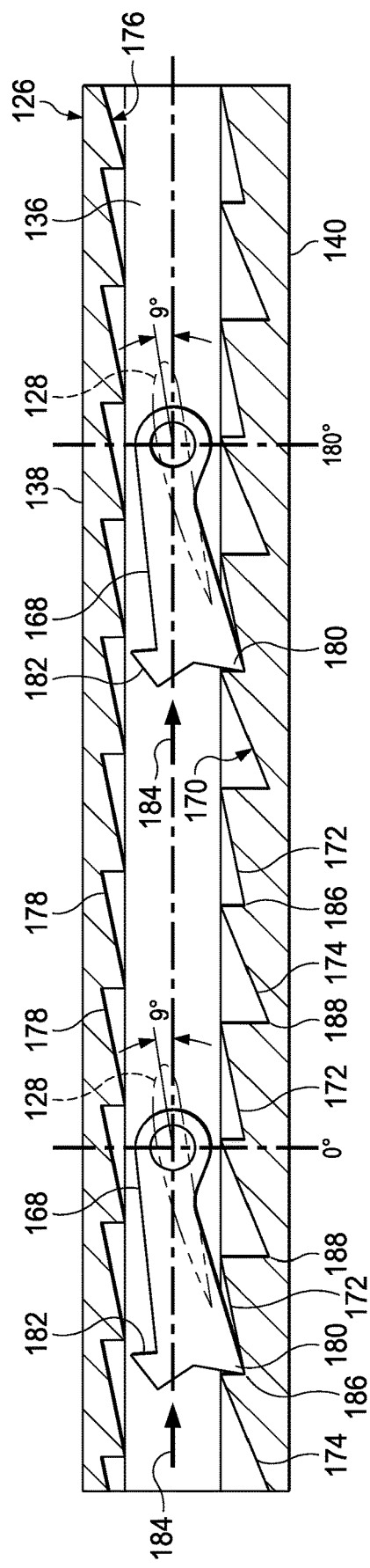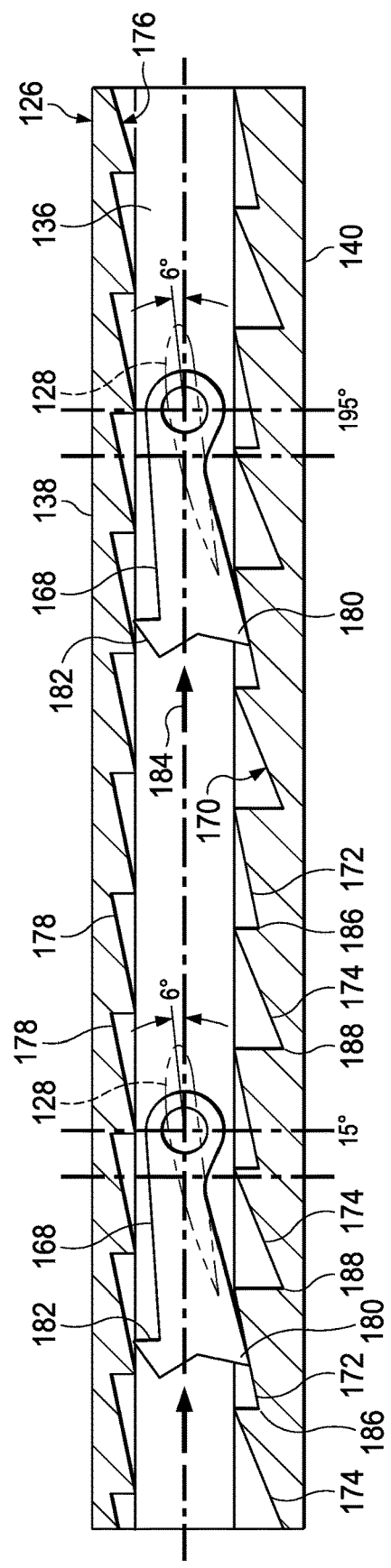
FIG. 9A
FIG. 9B

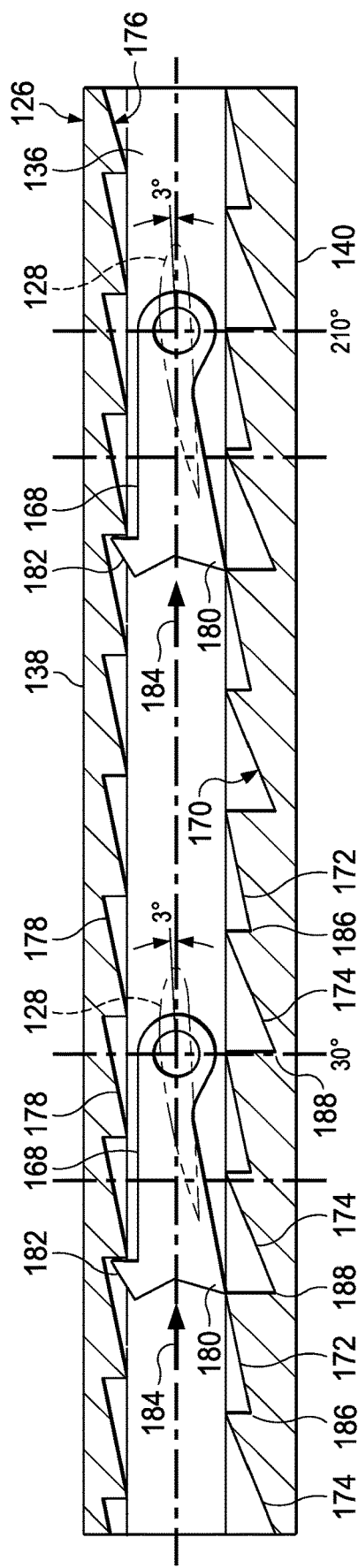
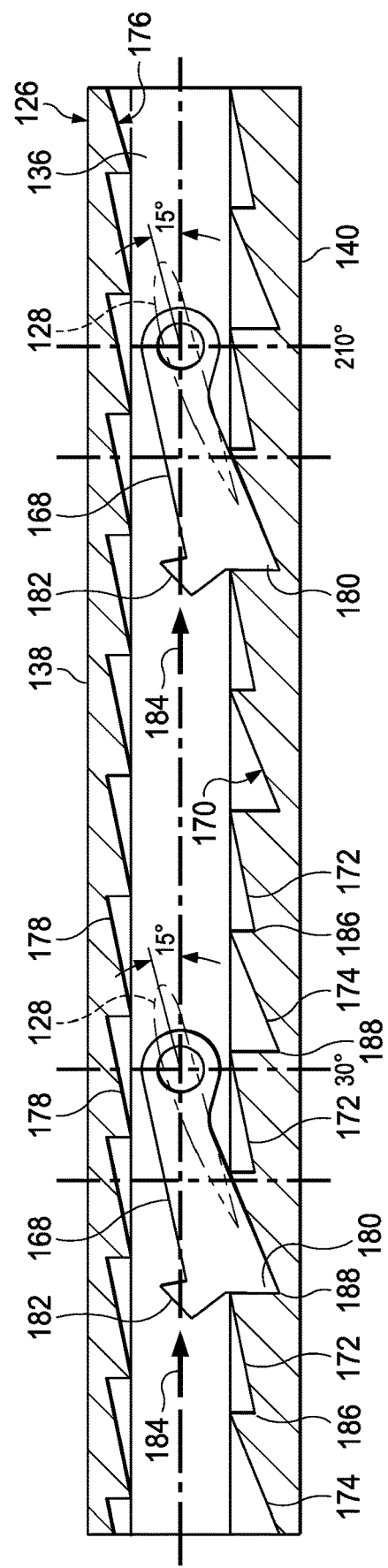
FIG. 9C
FIG. 9D

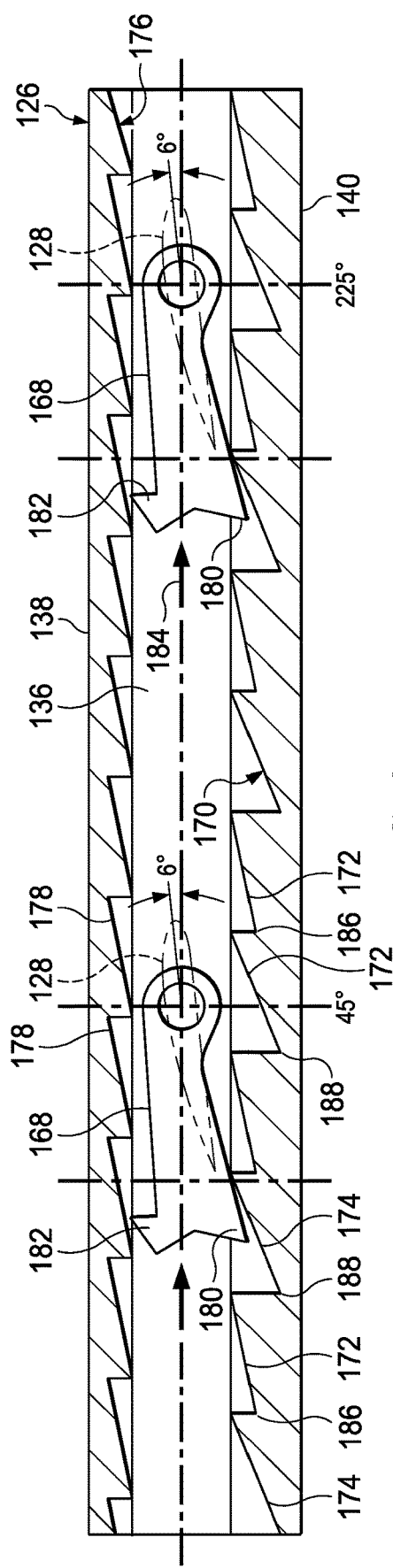
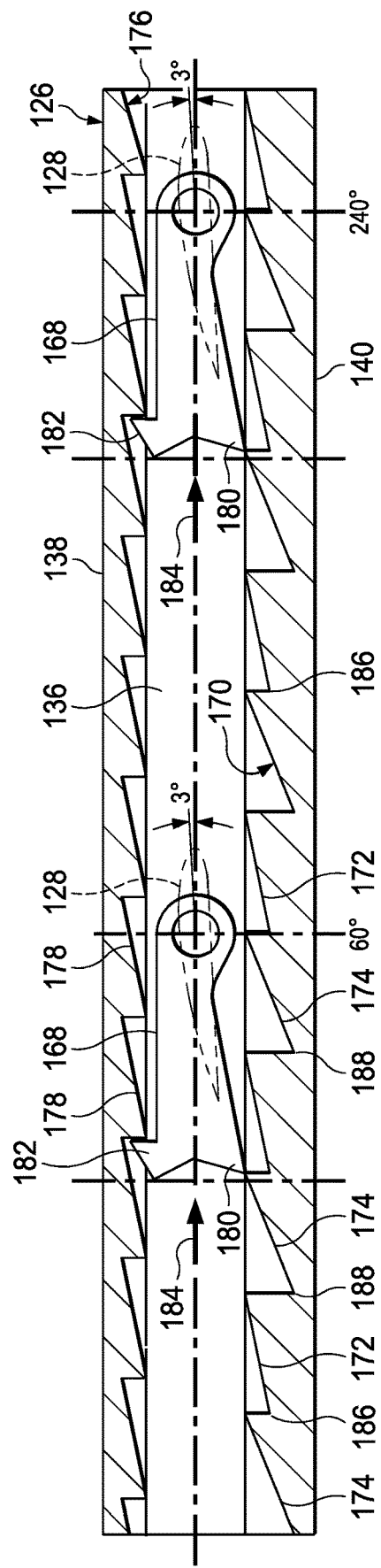
FIG. 9E
FIG. 9F

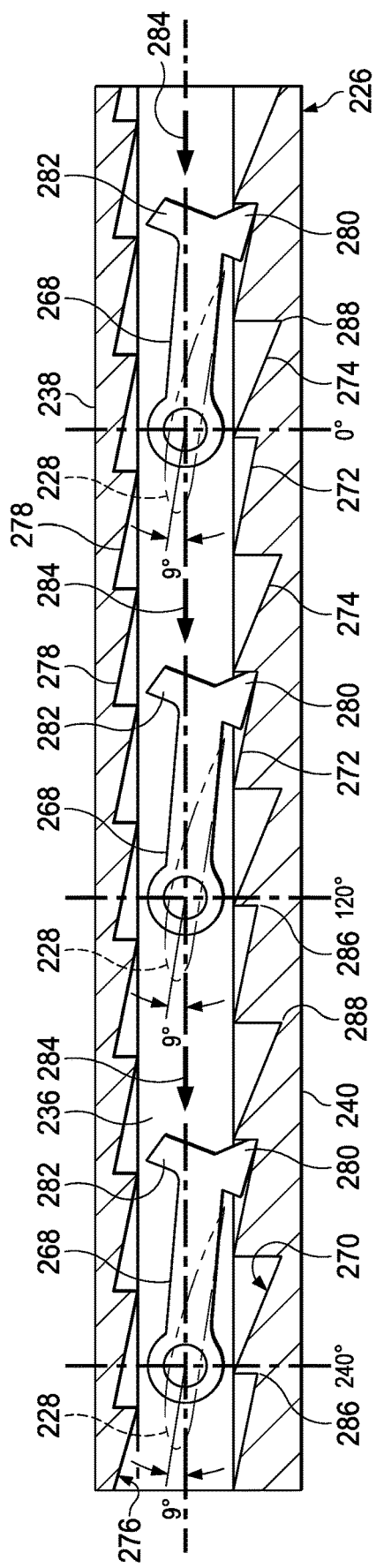
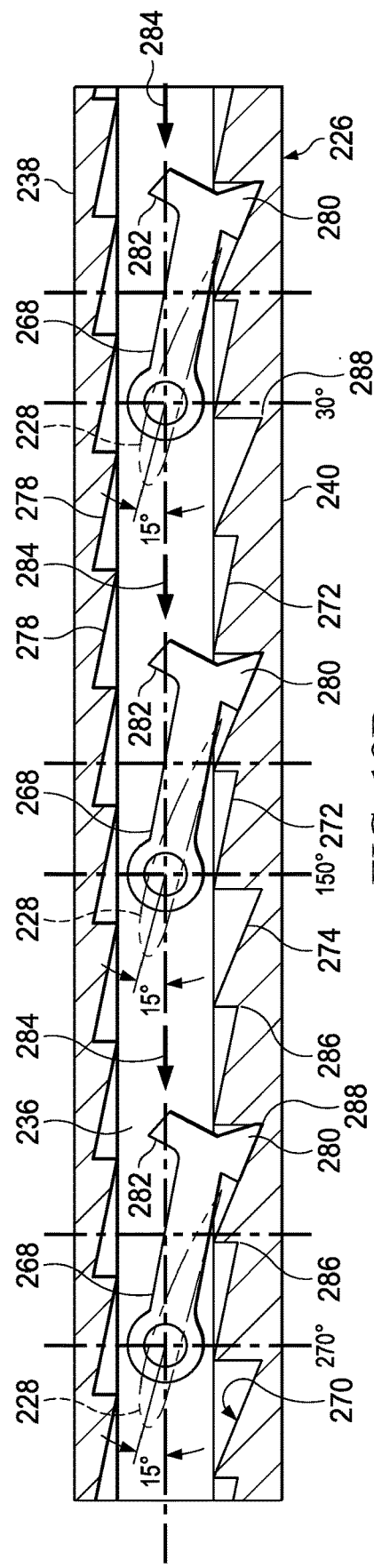
FIG. 19A
FIG. 19B

PITCH-CHANGE APPARATUS AND METHOD OF PITCHING ROTOR BLADES

BACKGROUND

Pitch, or blade angle on a rotor or propeller should be optimized for its intended application. For example, a shallow, or low-pitch, blade angle is optimized to generate high thrust when the aircraft is stationary or at low translational velocity. With increasing relative speed, however, a low-pitch blade must turn faster, and can become velocity limited by motor RPM and blade-tip speed limits. Conversely, a steep, or high-pitch, blade angle is optimized to generate high thrust at high translational velocity. And at low translational velocities a high-pitch blade requires escalating torque to turn and generates less thrust due to motor torque limitations.

In order to overcome this dilemma, aircraft that operate over a broad range of airspeeds may include a mechanism to vary the pitch of the blades. However, these mechanisms are generally tailored to large aircraft. Because these mechanisms are generally complex, and require an actuator and numerous moving parts, they are not well suited for use on small aircraft. Therefore, small aircraft that operate over a broad range of airspeeds generally utilize blades with a fixed moderate pitch. However, this compromise between the two optimal pitches results in a blade angle that provides inferior low and high translational velocity performance.

BRIEF DESCRIPTION OF THE DRAWINGS

FIGS. 9A-9G are sequential cross-sectional circumferential views of the variable-pitch rotor assembly of FIG. 3.

FIGS. 19A and 19B are sequential cross-sectional circumferential views of the variable-pitch rotor assembly of FIG. 12.

DETAILED DESCRIPTION

Figure 1:
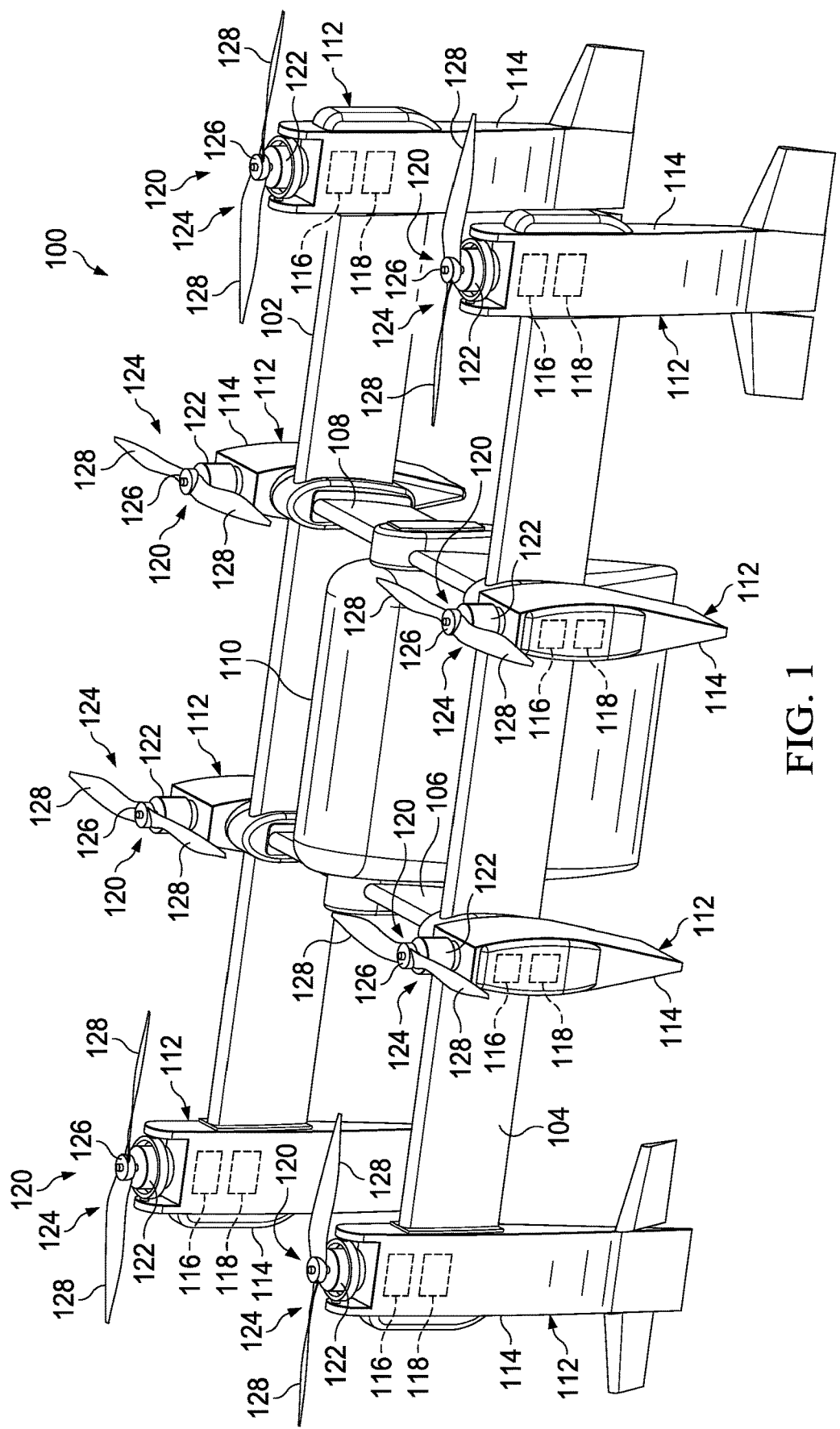
FIG. 1 is an oblique view of an aircraft including a plurality of variable-pitch rotor assemblies operating in a helicopter mode, according to this disclosure.

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges a pitch-change apparatus and method of pitching rotor blades. The pitch-change apparatus and method of pitching rotor blades may be particularly useful on small aircraft, such as unmanned aerial vehicles ("UAVs"), particularly tiltrotor, tiltwing, and tailsitter UAVs, which combine the vertical takeoff and landing, hovering, and low speed translational movement capabilities of a helicopter with the greater speed and range of an airplane. While the pitch-change apparatus and method of pitching rotor blades are described in reference to a tailsitter UAV, the method of pitching rotor blades may be utilized on any bladed rotor that may benefit from being able to change the angle of the blades and the pitch-change apparatus may be used to impart rotation to any members extending from a rotatable hub.

The pitch-change apparatus generally includes a first component, a second component rotatable relative to the first component about a first axis, and a member that is rotatable about a second axis that is transverse to the first axis, wherein interaction between the member and the first component and/or the second component during the relative rotation between the first and second components causes the member to rotate about the second axis. The method of pitching rotor blades generally includes applying torque to a hub to impart rotation of the hub about a rotor axis and decreasing the torque applied to the hub, wherein the decrease in torque results in rotation of the rotor blades about their respective pitch-change axes.

Figure 2:
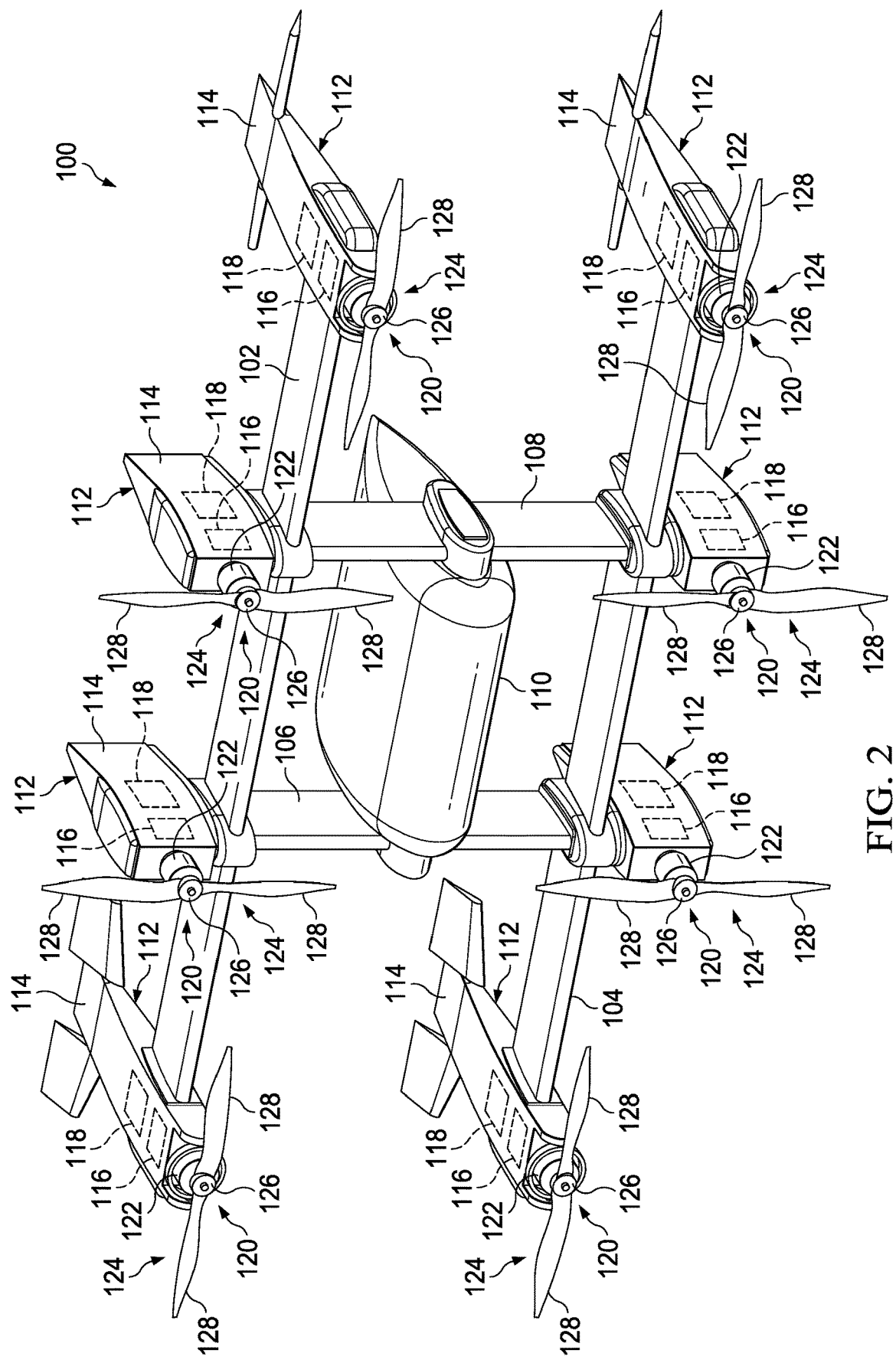
FIG. 2 is an oblique view of the aircraft of FIG. 1 operating in an airplane mode.
Figure 3:
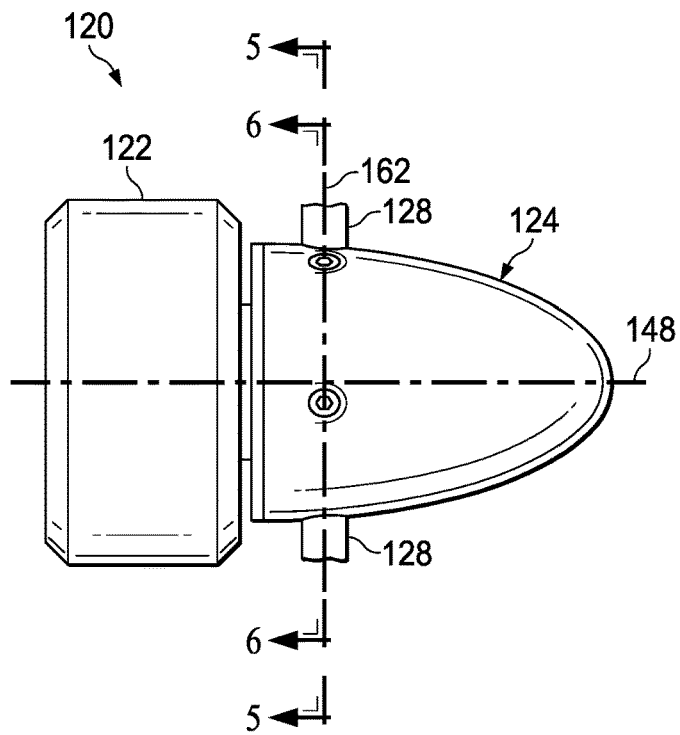
FIG. 3 is a side view of one of the plurality of variable-pitch rotor assemblies of the aircraft of FIG. 1, according to this disclosure.
Figure 4:
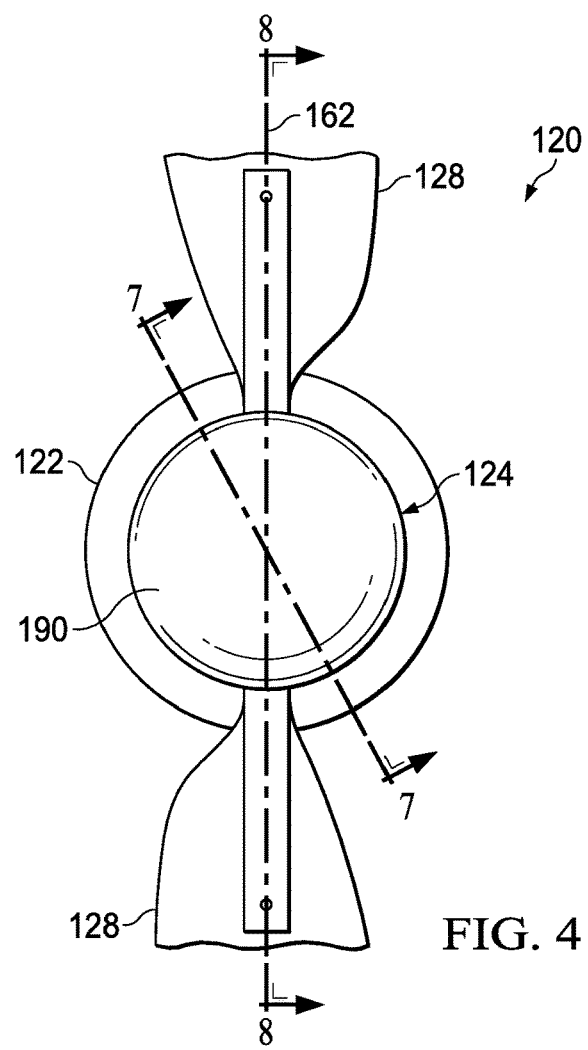
FIG. 4 is a top view of the variable-pitch rotor assembly of FIG. 3.

FIGS. 1 and 2 show a tailsitter UAV 100 that is operable to transition between thrust-borne lift in a helicopter mode and wing-borne lift in an airplane mode. UAV 100 includes a first wing 102 and a second wing 104 coupled together by a first pylon 106 and a second pylon 108, a payload compartment 110 coupled between first pylon 106 and second pylon 108, and a plurality of thrust modules 112 coupled to various locations on first wing 102 and second wing 104. Each thrust module 112 includes a nacelle 114 that houses an electronic speed controller 116 and a power source 118, and a propulsion system 120 coupled to nacelle 114. Each propulsion system 120 includes an electric motor 122 and a rotor assembly 124. Each rotor assembly 124 includes a pitch-change apparatus, shown as a hub 126, and a pair of rotor blades 128 coupled to hub 126, wherein hub 126 is configured to change the pitch of rotor blades 128 in response to an input from electric motor 122. FIG. 1 shows UAV 100 in helicopter mode, wherein propulsion systems 120 provide lift, and FIG. 2 shows UAV 100 in airplane mode, wherein propulsion systems 120 provide forward thrust and first wing 102 and second wing 104 provide lift. UAV 100 operates at a low translational velocity while in helicopter mode, and therefore, rotor blades 128 are utilized in a first position optimized for vertical lift, wherein they have a pitch of about nine degrees. UAV 100 operates at a high translational velocity in airplane mode, and therefore, rotor blades 128 are transitioned from the nine-degree first position to a second position optimized for horizontal thrust, wherein they have a pitch of about 15 degrees.

Figure 7:
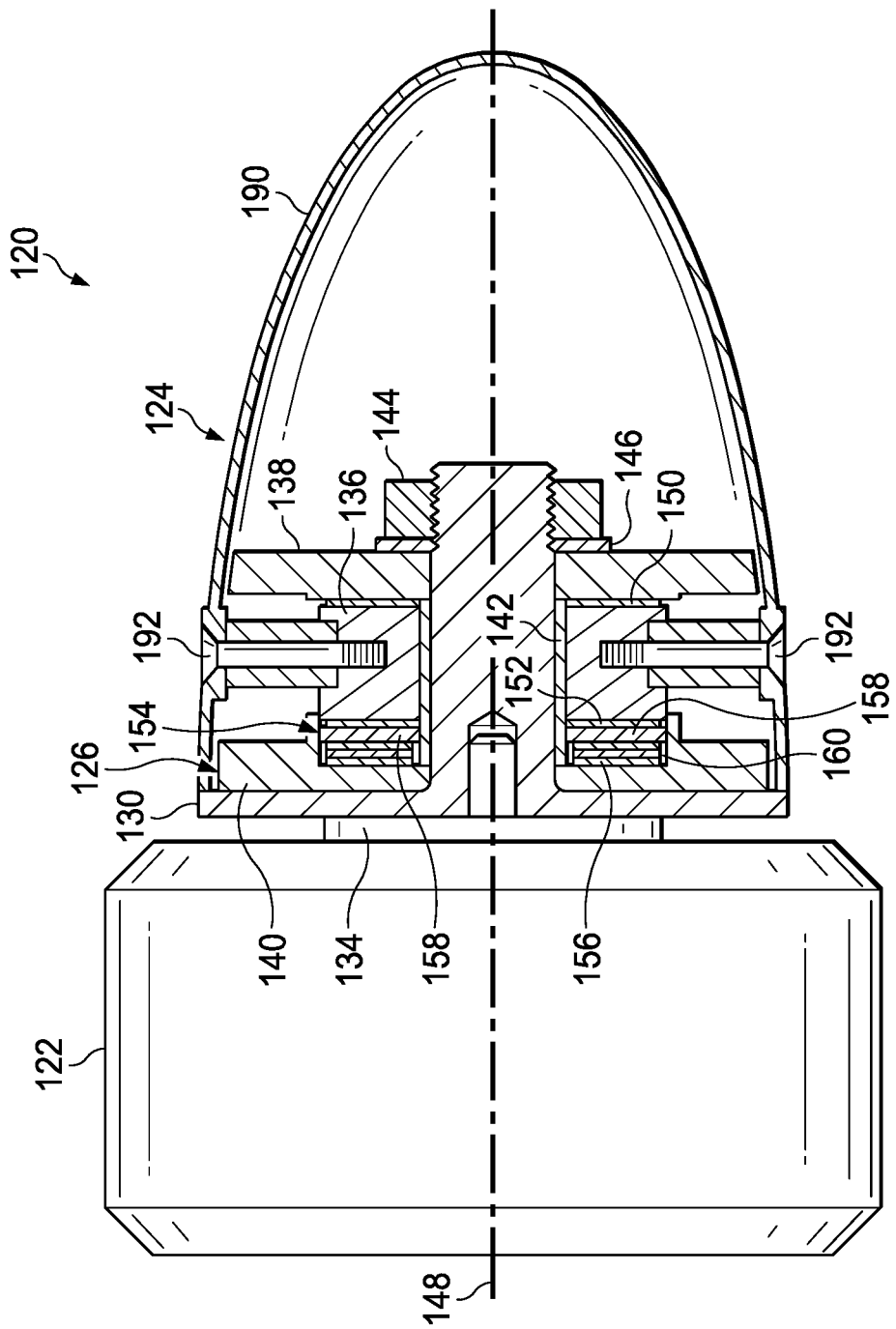
FIG. 7 is a cross-sectional side view of the variable-pitch rotor assembly of FIG. 3.
Figure 8:
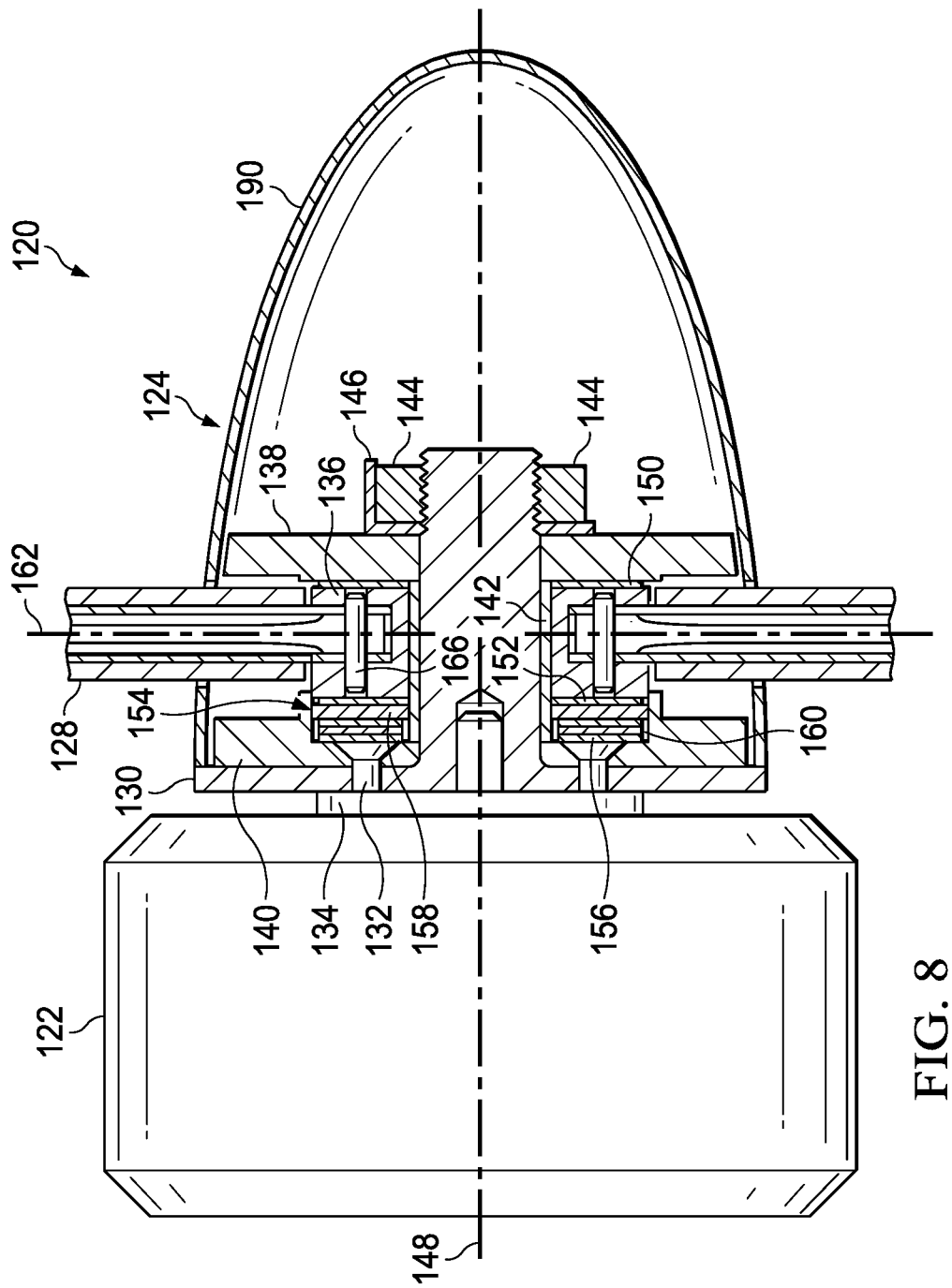
FIG. 8 is another cross-sectional side view of the variable-pitch rotor assembly of FIG. 3.

As best shown in FIGS. 7 and 8, propulsion system 120 includes a shaft 130 coupled via screws 132 to a driveshaft 134 of electric motor 122. Hub 126 includes a core 136 disposed between an upper plate 138 and a lower plate 140. Lower plate 140 is coupled to shaft 130 via screws 132. A bearing 142 is clamped between upper plate 138 and lower plate 140 by a nut 144 threaded onto shaft 130. And nut 144 is rotationally secured to shaft 130 by a bent tab washer 146. Shaft 130 and upper plate 138 include complimentary D features to prevent relative rotation therebetween. As such, upper plate 138 and lower plate 140 are rigidly coupled for common rotation with shaft 130 about a rotor axis 148, and bearing 142 permits core 136 to rotate relative to upper plate 138, lower plate 140, and shaft 130. Relative rotation therebetween is further facilitated by an upper anti-friction washer 150 disposed between core 136 and upper plate 138 and a lower anti-friction washer 152 disposed between core 136 and a friction-slip clutch 154. Friction-slip clutch 154 comprises four springs 156 and shims 158 housed within pockets 160 of lower plate 140 and biases core 136 towards upper plate 138 to control the force required to rotate core 136 relative to upper plate 138 and lower plate 140.

Figure 5:
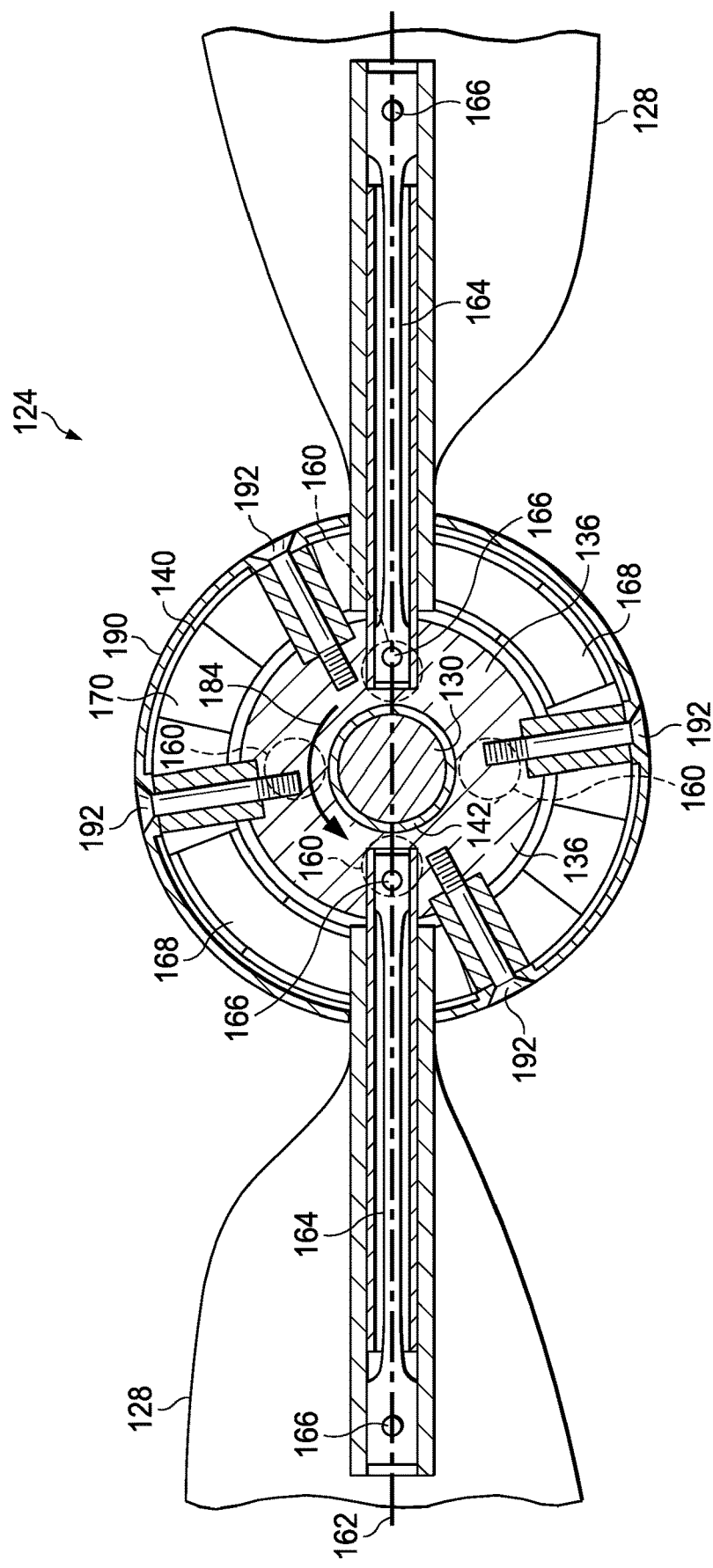
FIG. 5 is a cross-sectional top view of the variable-pitch rotor assembly of FIG. 3.
Figure 6:
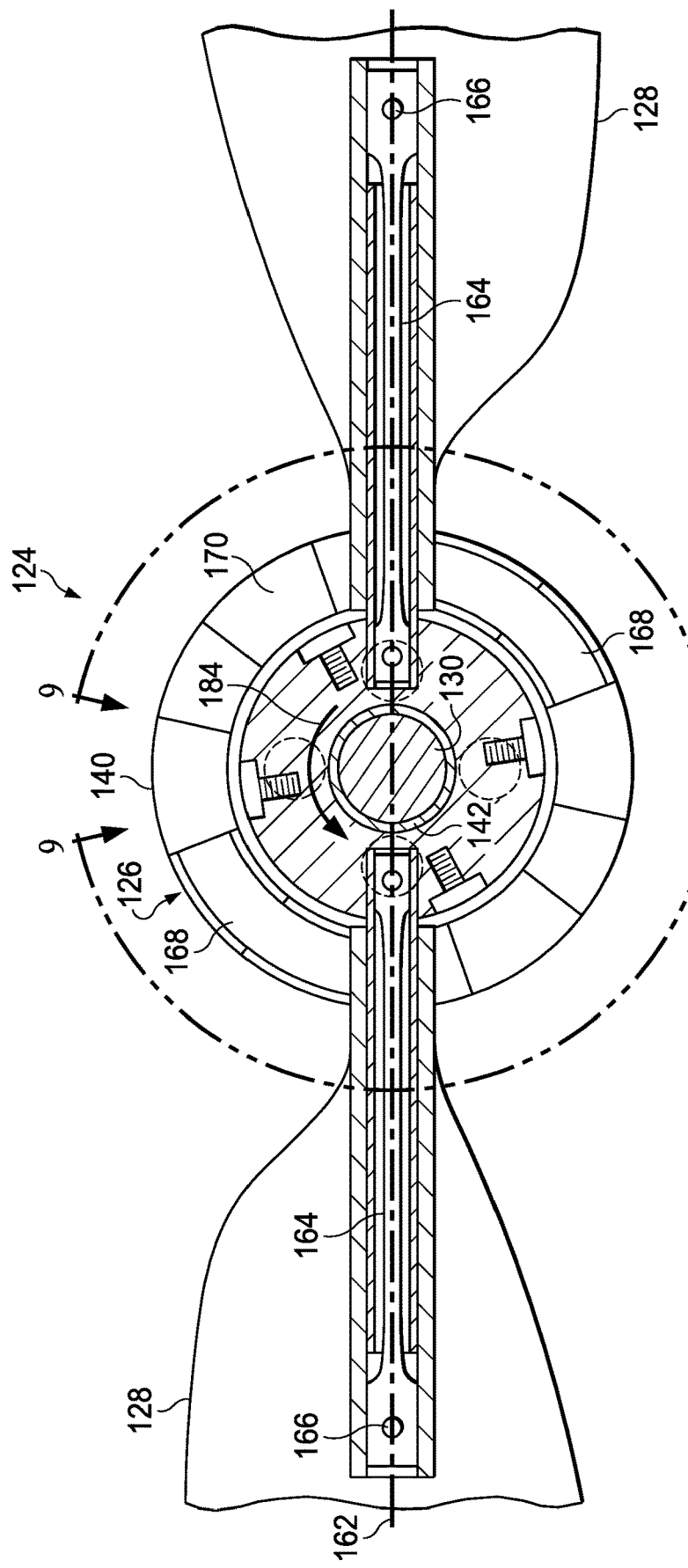
FIG. 6 is another cross-sectional top view of the variable-pitch rotor assembly of FIG. 3.

As best shown in FIGS. 5, 6, and 8, each rotor blade 128 is rotatably coupled to core 136 about a pitch-change axis 162 by a torsion strap 164. Torsion strap 164 is coupled to rotor blade 128 and core 136 via press-fit pins 166. As best shown in FIGS. 5, 6, and 9A-9G, each rotor blade 128 includes a pitch horn 168 configured to cooperatively engage upper plate 138 and lower plate 140. Torsion strap 164 is configured to bias pitch horn 168 towards lower plate 140. Lower plate 140 has a lower ratcheted surface 170 comprising six first-position teeth 172 alternating with six second-position teeth 174. Upper plate 138 has an upper ratcheted surface 176 comprising twelve teeth 178. Pitch horn 168 includes a lower pawl 180 configured to engage lower ratcheted surface 170 and an upper pawl 182 configured to engage upper ratcheted surface 176. Engagement between lower pawl 180 and lower ratcheted surface 170 is configured to permit core 136 to rotate relative to lower plate 140 only in a first direction, indicated by arrows 184. Engagement between upper pawl 182 and upper ratcheted surface 176 is configured to prevent core 136 from rotating relative to lower plate 140 more than one first-position tooth 172 or second-position tooth 174 at a time. The depth of first-position teeth 172 and second-position teeth 174 correlate to the first-position pitch angle and second-position pitch angle, respectively, of rotor blades 128. As shown in FIGS. 9A-9G, first-position teeth 172 have a first depth 186 correlating to the nine-degree pitch of rotor blade 128 and second-position teeth 174 have a second depth 188 correlating to a fifteen-degree pitch of rotor blade 128. That is, the deeper second depth 188 of second-position teeth 174 allow torsion strap 164 to rotate rotor blade 128 further about pitch-change axis 162 compared to the shallower first depth 186 of first-position teeth 172. While lower ratcheted surface 170 only includes six first-position teeth 172 and six second-position teeth 174, which correspond to blade angles of nine and fifteen degrees, it should be understood that lower ratcheted surface 170 may include other teeth with depths that correspond to any angle desired. For example, lower ratcheted surface 170 may have as few as four teeth and as many as desired, and the angles may vary between one degree and eighty-nine degrees. Moreover, while rotor assembly 124 is shown with two rotor blades 128, it may include any number of rotor blades.

As shown in FIGS. 3-5, 7, and 8, rotor assembly 124 includes a fairing 190 coupled to core 136 for common rotation therewith about rotor axis 148. Fairing 190 is coupled to core 136 via four screws 192, with one screw 192 adjacent to each side of each rotor blade 128.

The method of pitching rotor blades 128 is described below in the context of propulsion system 120 during a flight of UAV 100. FIG. 9A shows hub 126 with rotor blades 128 in the first position, with rotor blades 128 pitched at nine degrees, corresponding to the helicopter mode of UAV 100. Electronic speed controller 116 commands electric motor 122 to rotate, and electric motor 122 applies torque from driveshaft 134, through shaft 130, to upper plate 138 and lower plate 140. Engagement of lower pawl 180 with second-position tooth 174 causes core 136 to rotate about rotor axis 148 in synchrony with shaft 130, upper plate 138, and lower plate 140. With rotor blades 128 in the first position, UAV 100 may take-off, hover, translate at low speed, and land. When high-speed translation is desired, a pitch-change is initiated by electronic speed controller 116 commanding electric motor 122 to rapidly slow, stop, or even momentarily reverse the output rotational velocity, thereby rapidly decreasing, ceasing, or reversing the torque applied to shaft 130, upper plate 138, and lower plate 140. However, as shown in FIG. 9B, while the decrease, cease, or reverse of torque applied to shaft 130 causes rotation of upper plate 138 and lower plate 140 to slow down, stop, or reverse, the rotational inertia of core 136 and rotor blades 128 causes core 136 to continue rotating in the first direction 184 about rotor axis 148. Therefore, in response to the changed input of electric motor 122, core 136 rotates relative to upper plate 138 and lower plate 140. As core 136 rotates relative to lower plate 140, lower pawl 180 rides up the surface of first-position tooth 172 until lower pawl 180 clears the peak of first-position tooth 172, as shown in FIG. 9C. In order to prevent core 136 from rotating past the adjacent second-position tooth 174, upper pawl 182 may contact adjacent tooth 178. This contact between upper pawl 182 and tooth 178 arrests the relative rotation between core 136 and upper plate 138 and lower plate 140. Hub 126 is configured so that when upper pawl 182 is in contact with tooth 178, lower pawl 180 has cleared the peak of first-position tooth 172, at which point torsion strap 164 will push pitch horn 168 back towards lower plate 140 until lower pawl 180 is in contact with second-position tooth 174, resulting in rotor blades 128 assuming the fifteen-degree second position, as shown in FIG. 9D. At a point between initiating the pitch-change and lower pawl 180 engaging second-position tooth 174, electronic speed controller 116 commands electric motor 122 to increase output rotational velocity, thereby applying torque to upper plate 138 and lower plate 140 through shaft 130, and causing core 136 to again rotate in synchrony therewith. With rotor blades 128 now pitched fifteen degrees, UAV 100 is optimized for high-speed translation. The pitch-change to the second position may be performed before, during, or after the transition of UAV 100 from helicopter mode to airplane mode.

Figure 9G:
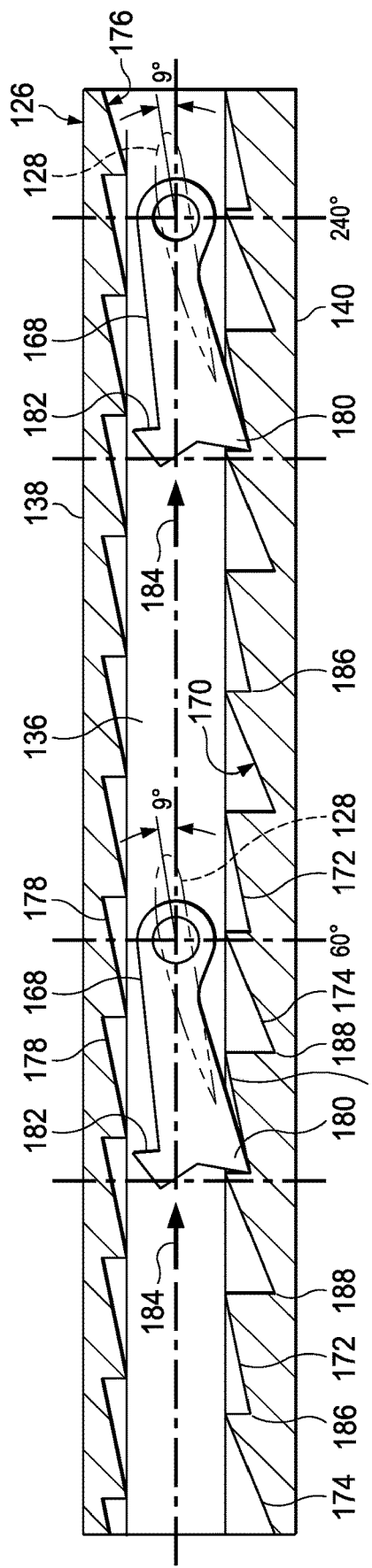

When a return to low-speed translation is desired, the pitch-change procedure is simply repeated. That is, electronic speed controller 116 commands electric motor 122 to rapidly slow, stop, or even momentarily reverse the output rotational velocity, thereby rapidly decreasing, ceasing, or reversing the torque applied to shaft 130, upper plate 138, and lower plate 140. As shown in FIG. 9E, while the decrease, cease, or reverse of torque applied to shaft 130 causes rotation of upper plate 138 and lower plate 140 to slow down, stop, or reverse, the rotational inertia of core 136 and rotor blades 128 causes core 136 to continue rotating in the first direction 184 about rotor axis 148. As core 136 rotates relative to lower plate 140, lower pawl 180 rides up the surface of second-position tooth 174 until lower pawl 180 clears the peak of second-position tooth 174, as shown in FIG. 9F. In order to prevent core 136 from rotating past the adjacent first-position tooth 172, upper pawl 182 may contact adjacent tooth 178. This contact between upper pawl 182 and tooth 178 arrests the relative rotation between core 136 and upper plate 138 and lower plate 140. At this point, torsion strap 164 will push pitch horn 168 back towards lower plate 140 until lower pawl 180 is in contact with first-position tooth 172, resulting in rotor blades 128 assuming the nine-degree first position, as shown in FIG. 9G. At a point between initiating the pitch-change and lower pawl 180 engaging first-position tooth 172, electronic speed controller 116 commands electric motor 122 to increase output rotational velocity, thereby applying torque to upper plate 138 and lower plate 140 through shaft 130, and causing core 136 to again rotate in synchrony therewith. With rotor blades 128 now pitched nine degrees, UAV 100 is optimized for low-speed translation. The pitch-change back to the first position may be performed before, during, or after the transition of UAV 100 from airplane mode to helicopter mode.

The duration of the pitch-change, and therefore, the amount of time that electric motor 122 reduces, ceases, or reverses the torque applied, may be adjusted by varying the force applied by friction-slip clutch 154. That is, adding stronger springs 156 or inserting larger shims 158 may cause slower relative rotation between core 136 and lower plate 140, necessitating a longer period of torque interruption. However, the larger the force applied by friction-slip clutch 154, the less likely it is that hub 126 will experience inadvertent relative movement between core 136 and lower plate 140, resulting in undesired blade pitching caused simply by changes in torque input from electric motor 122 that were only intended to change thrust output.

Figure 10:
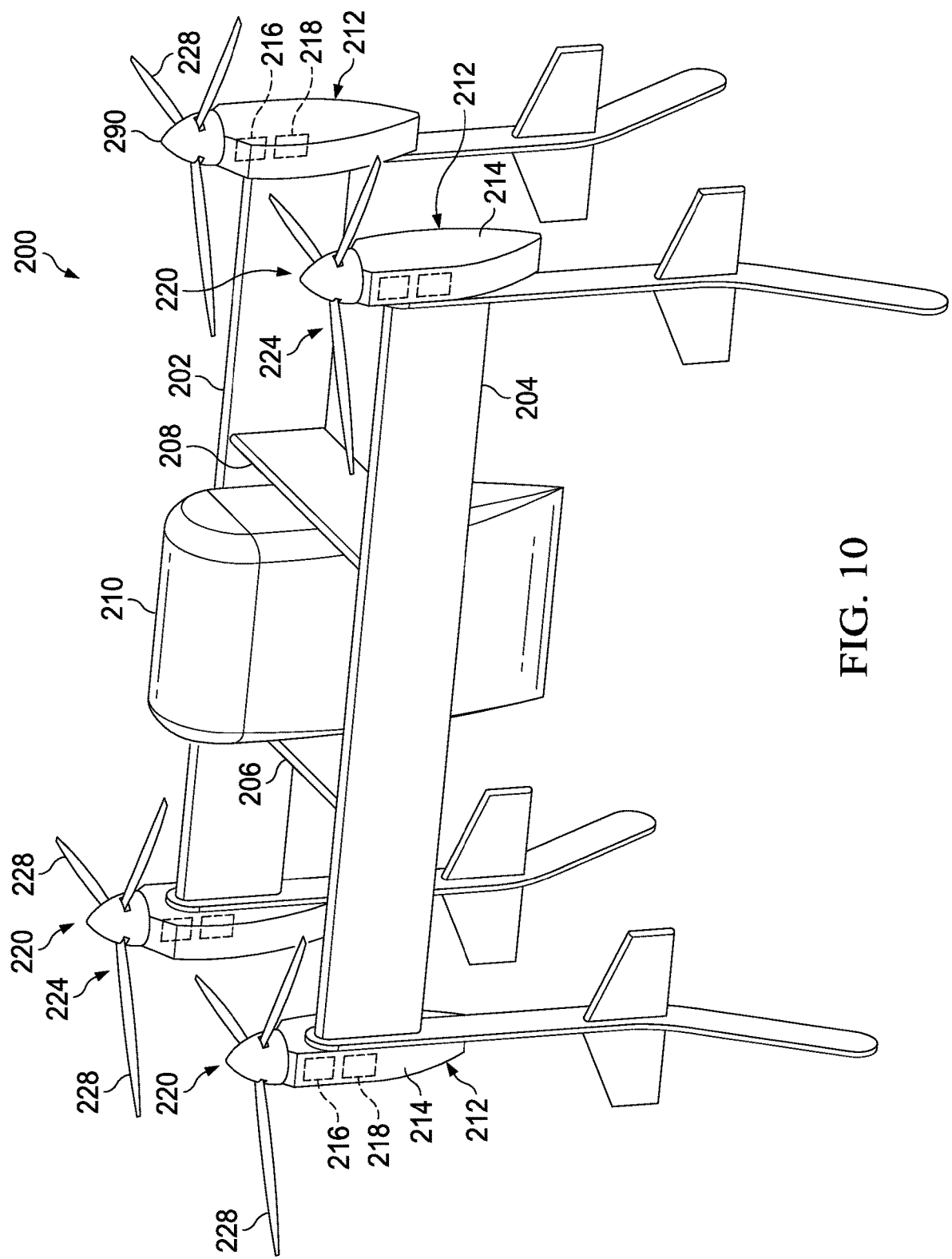
FIG. 10 is an oblique view of another aircraft including a plurality of variable-pitch rotor assemblies operating in a helicopter mode, according to this disclosure.
Figure 11:
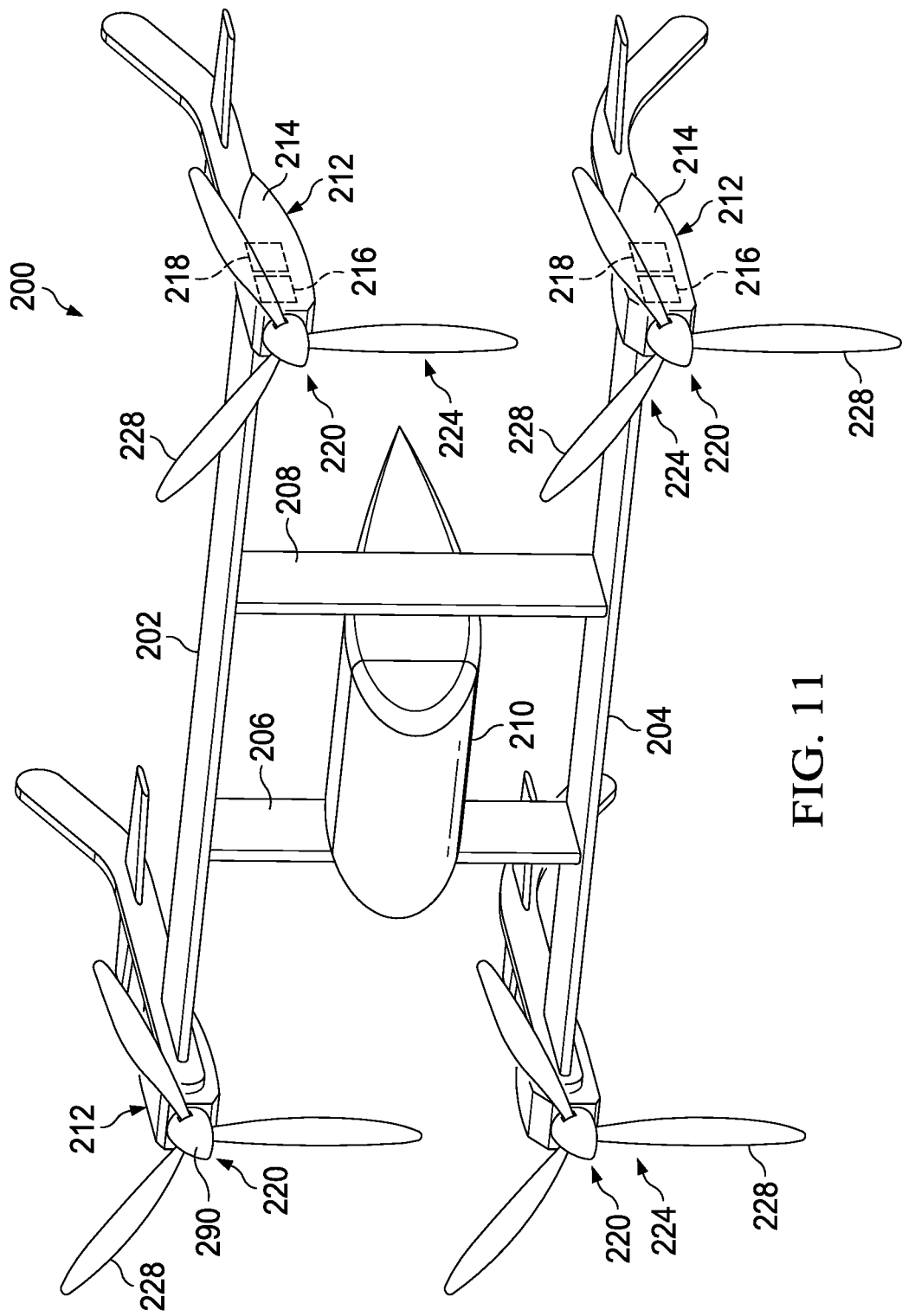
FIG. 11 is an oblique view of the aircraft of FIG. 10 operating in an airplane mode.

FIGS. 10 and 11 show a tailsitter UAV 200 that is operable to transition between thrust-borne lift in a helicopter mode and wing-borne lift in an airplane mode. UAV 200 includes a first wing 202 and a second wing 204 coupled together by a first pylon 206 and a second pylon 208, a payload compartment 210 coupled between first pylon 206 and second pylon 208, and four thrust modules 212 coupled to the outboard ends of first wing 202 and second wing 204. Each thrust module 212 includes a nacelle 214 that houses an electronic speed controller 216 and a power source 218, and a propulsion system 220 coupled to nacelle 214. Each propulsion system 220 includes an electric motor 222 and a rotor assembly 224. Each rotor assembly 224 includes a pitch-change apparatus, shown as a hub 226, and three rotor blades 228 coupled to hub 226, wherein hub 226 is configured to change the pitch of rotor blades 228 in response to an input from electric motor 222. FIG. 10 shows UAV 200 in helicopter mode, wherein propulsion systems 220 provide lift, and FIG. 11 shows UAV 200 in airplane mode, wherein propulsion systems 220 provide forward thrust and first wing 202 and second wing 204 provide lift. UAV 200 operates at a low translational velocity while in helicopter mode, and therefore, rotor blades 228 are utilized in a first position optimized for vertical lift, wherein they have a pitch of about nine degrees. UAV 200 operates at a high translational velocity in airplane mode, and therefore, rotor blades 228 are transitioned from the nine-degree first position to a second position optimized for horizontal thrust, wherein they have a pitch of about 15 degrees.

Figure 15:
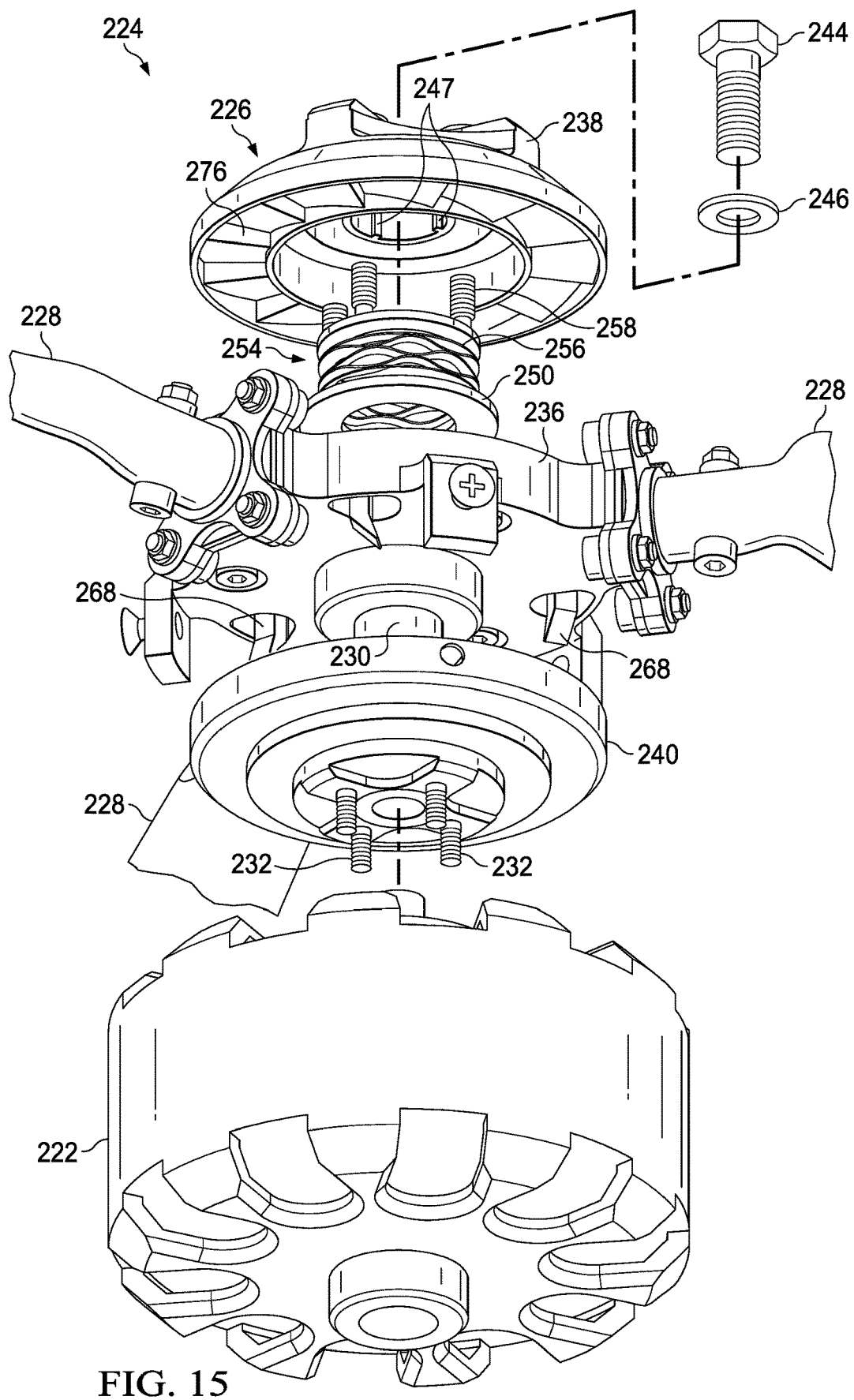
FIG. 15 is an oblique exploded view of the variable-pitch rotor assembly of FIG. 12.
Figure 16:
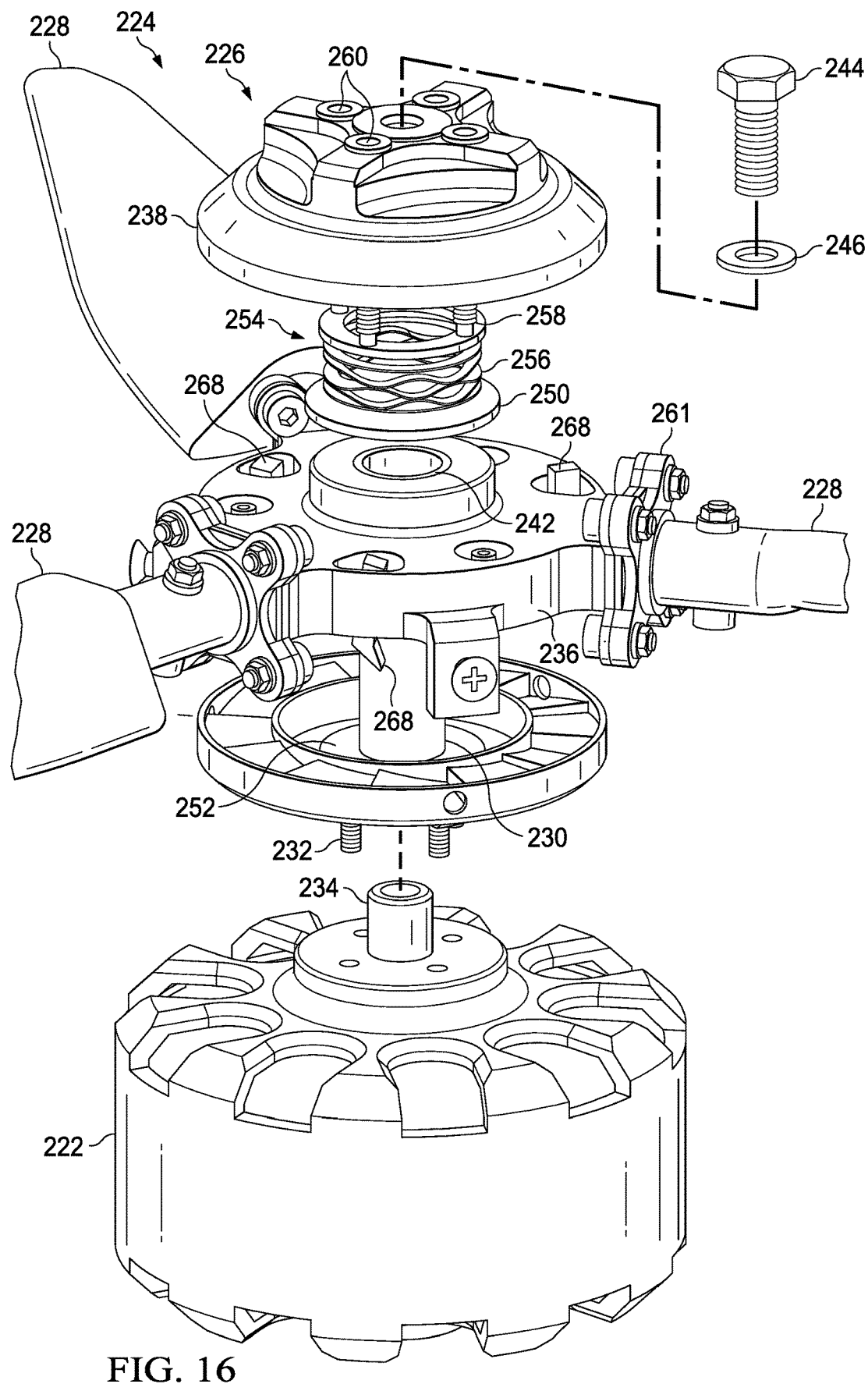
FIG. 16 is another oblique exploded view of the variable-pitch rotor assembly of FIG. 12.
Figure 17:
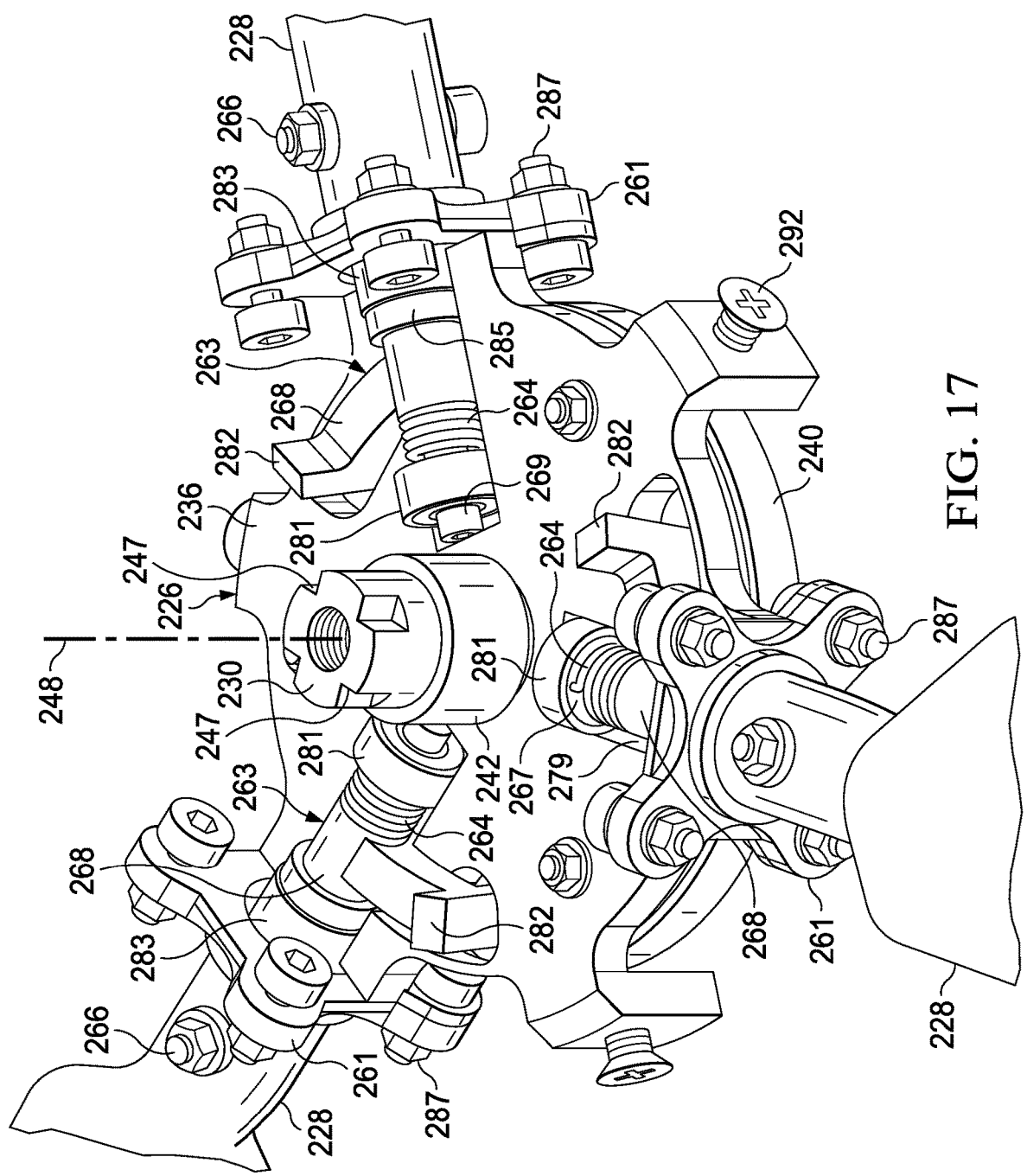
FIG. 17 is an oblique cross-sectional view of the variable-pitch rotor assembly of FIG. 12.
Figure 18:
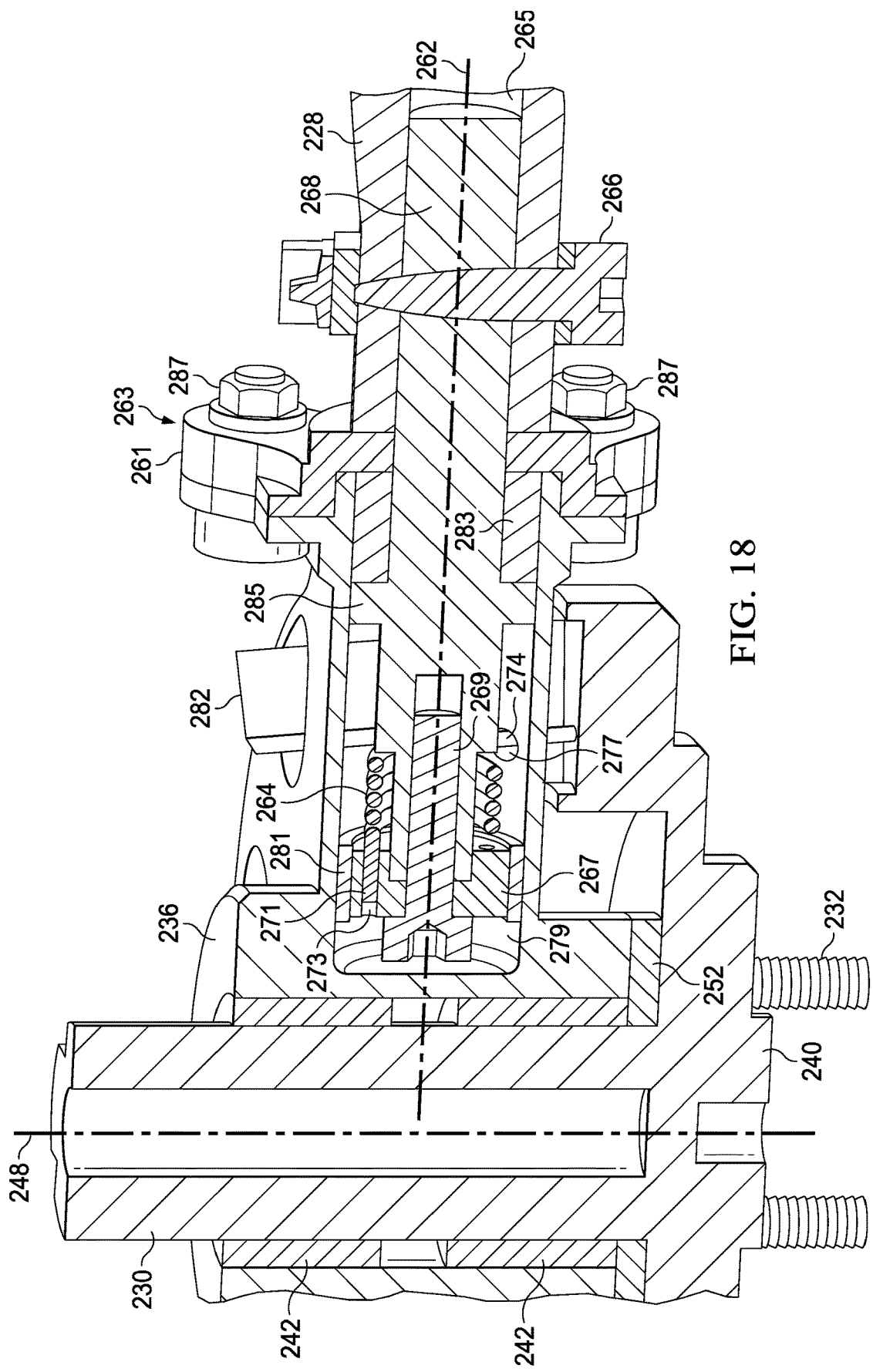
FIG. 18 is another oblique cross-sectional view of the variable-pitch rotor assembly of FIG. 12.

As shown in FIGS. 15 and 16, hub 226 includes a core 236 disposed between an upper plate 238 and a lower plate 240. Lower plate 240 of hub 226 is coupled via screws 232 to a driveshaft 234 of electric motor 222 and includes a shaft portion 230 extending through core 136 into upper plate 238. As shown in FIGS. 16-18, core 136 is separated from shaft portion 230 of lower plate 240 by a pair of roller bearings 242 that are configured to permit relative rotation between lower plate 240 and core 136. Upper plate 238 is coupled to shaft portion 230 of lower plate 240 by a screw 244 threaded into shaft portion 230. And screw 244 is rotationally secured to upper plate 238 by a bent tab washer 246. Shaft portion 230 and upper plate 238 include complimentary notches 247 to prevent relative rotation therebetween. As such, upper plate 238 and lower plate 240 are rigidly coupled for common rotation about a rotor axis 248, and roller bearings 242 permit core 236 to rotate relative to upper plate 238 and lower plate 240. Relative rotation therebetween is further facilitated by an upper anti-friction washer 250 disposed between core 236 and a friction-slip clutch 254 and a lower anti-friction washer 252 disposed between core 236 and lower plate 240. Friction-slip clutch 254 comprises a wave spring 256 and four adjustment screws 258 extending through apertures 260 in upper plate 238 and biases core 236 towards lower plate 240 to control the force required to rotate core 236 relative to upper plate 238 and lower plate 240.

As best shown in FIG. 18, each rotor blade 228 is rotatably coupled to core 236 about a pitch-change axis 262 by a plate 261 of a pitch-horn assembly 263. Pitch-horn assembly 263 includes a pitch horn 268 having a distal end that is received within an opening 265 of rotor blade 228 and is coupled to rotor blade 228 by a bolt 266. Pitch-horn assembly 263 further includes a torsion spring 264 encircling a proximal end of pitch horn 268 and a spring retainer 267 coupled to the proximal end of pitch horn 268 by a screw 269. Torsion spring 264 is includes a first end 271 inserted into an aperture 273 in spring retainer 267 and a second end 275 inserted into an aperture 277 in core 236. As such, torsion spring 264 is configured to bias pitch horn 268 towards lower plate 240. The proximal end of pitch horn 268, torsion spring 264, and spring retainer 267 are disposed within an opening 279 of core 236 and are separated from core 236, and aided in relative rotation thereto about pitch-change axis 262, by an inner bearing 281 surrounding spring retainer 267 and an outer bearing 283 surrounding pitch horn 268. Outer bearing 283 is disposed between a flange 285 on pitch horn 268 and plate 261. Plate 261 is coupled to core 236 via four bolts 287.

As shown in FIGS. 15-19B pitch horn 268 is configured to cooperatively engage upper plate 238 and lower plate 240. Lower plate 240 has a lower ratcheted surface 270 comprising six first-position teeth 272 alternating with six second-position teeth 274. Upper plate 238 has an upper ratcheted surface 276 comprising twelve teeth 278. Pitch horn 268 includes a lower pawl 280 configured to engage lower ratcheted surface 270 and an upper pawl 282 configured to engage upper ratcheted surface 276. Engagement between lower pawl 280 and lower ratcheted surface 270 is configured to permit core 236 to rotate relative to lower plate 240 only in a first direction, indicated by arrows 284. Engagement between upper pawl 282 and upper ratcheted surface 276 is configured to prevent core 236 from rotating relative to lower plate 240 more than one first-position tooth 272 or second-position tooth 274 at a time. The depth of first-position teeth 272 and second-position teeth 274 correlate to the first-position pitch angle and second-position pitch angle, respectively, of rotor blades 228. As shown in FIGS. 19A and 19B, first-position teeth 272 have a first depth 286 correlating to the nine-degree pitch of rotor blade 228 and second-position teeth 274 have a second depth 288 correlating to a fifteen-degree pitch of rotor blade 228. That is, the deeper second depth 288 of second-position teeth 274 allow torsion spring 264 to rotate rotor blade 228 further about pitch-change axis 262 compared to the shallower first depth 286 of first-position teeth 272. While lower ratcheted surface 270 only includes six first-position teeth 272 and six second-position teeth 274, which correspond to blade angles of nine and fifteen degrees, it should be understood that lower ratcheted surface 270 may include other teeth with depths that correspond to any angle desired. For example, lower ratcheted surface 270 may have as few as six teeth and as many as desired, and the angles may vary between one degree and eighty-nine degrees. Moreover, while rotor assembly 224 is shown with three rotor blades 228, it may include any number of rotor blades.

Figure 12:
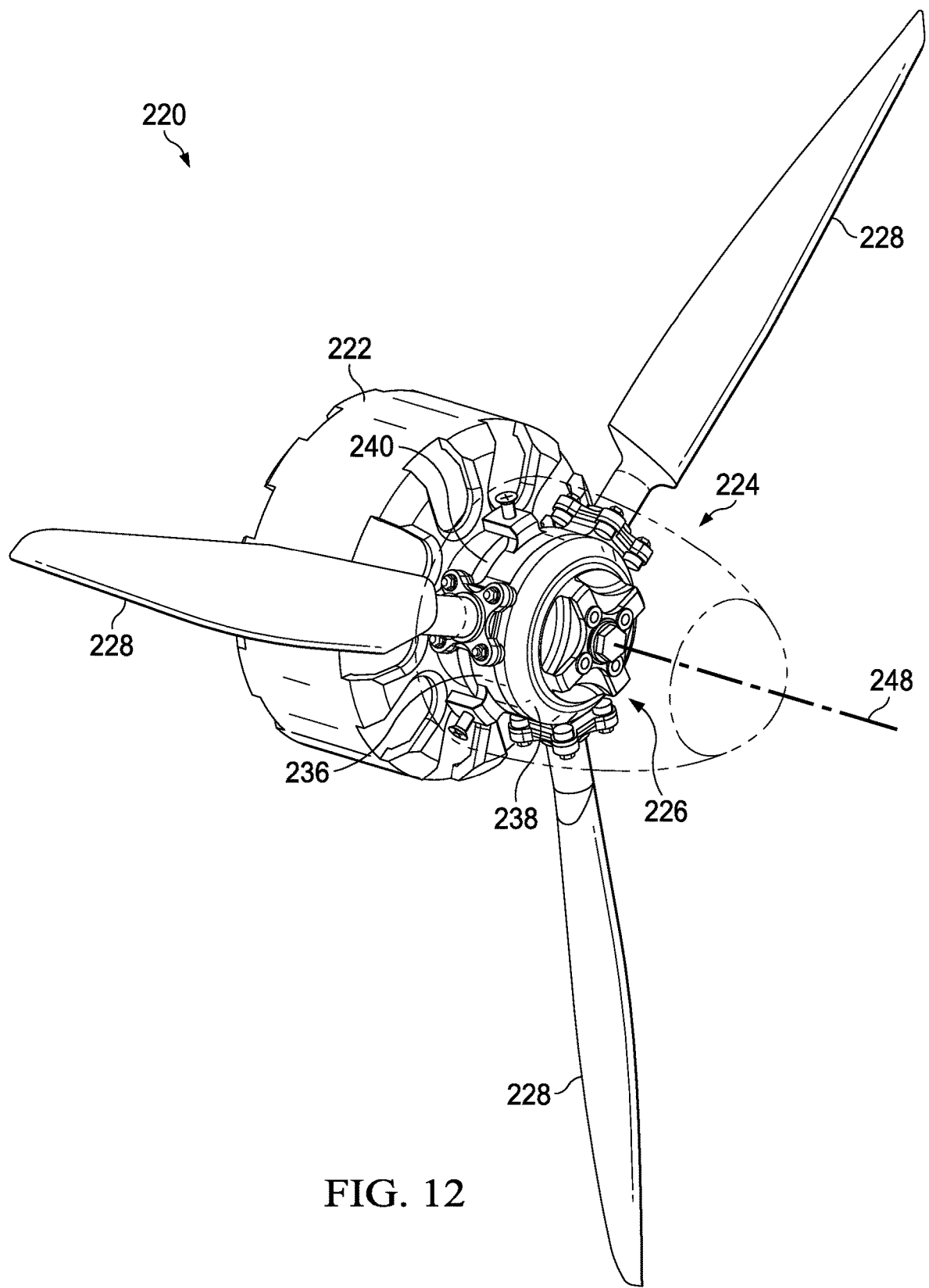
FIG. 12 is an oblique view of one of the plurality of variable-pitch rotor assemblies of the aircraft of FIG. 10, according to this disclosure.
Figure 13:
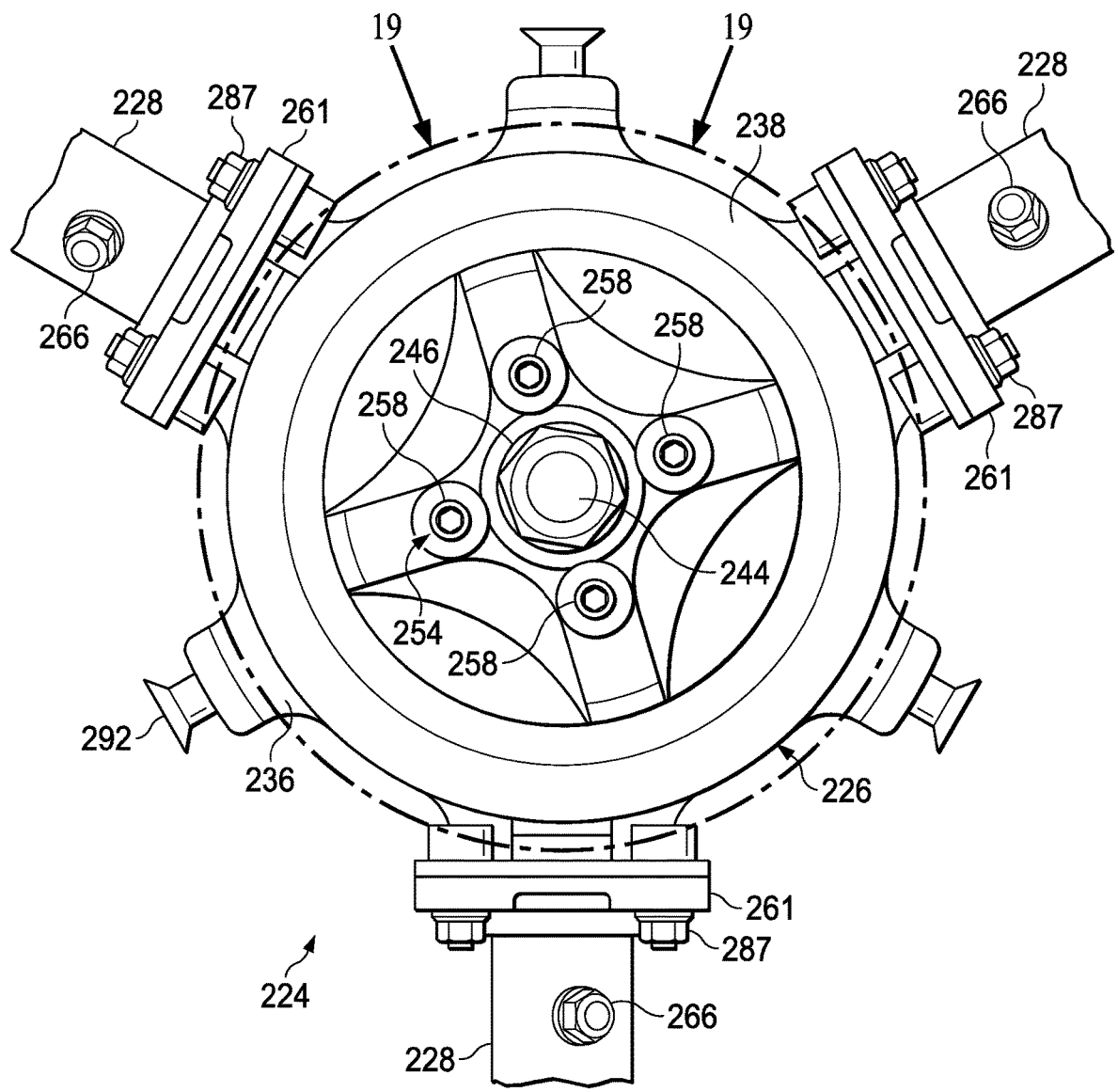
FIG. 13 is a top view the variable-pitch rotor assembly of FIG. 12 with a fairing removed.
Figure 14:
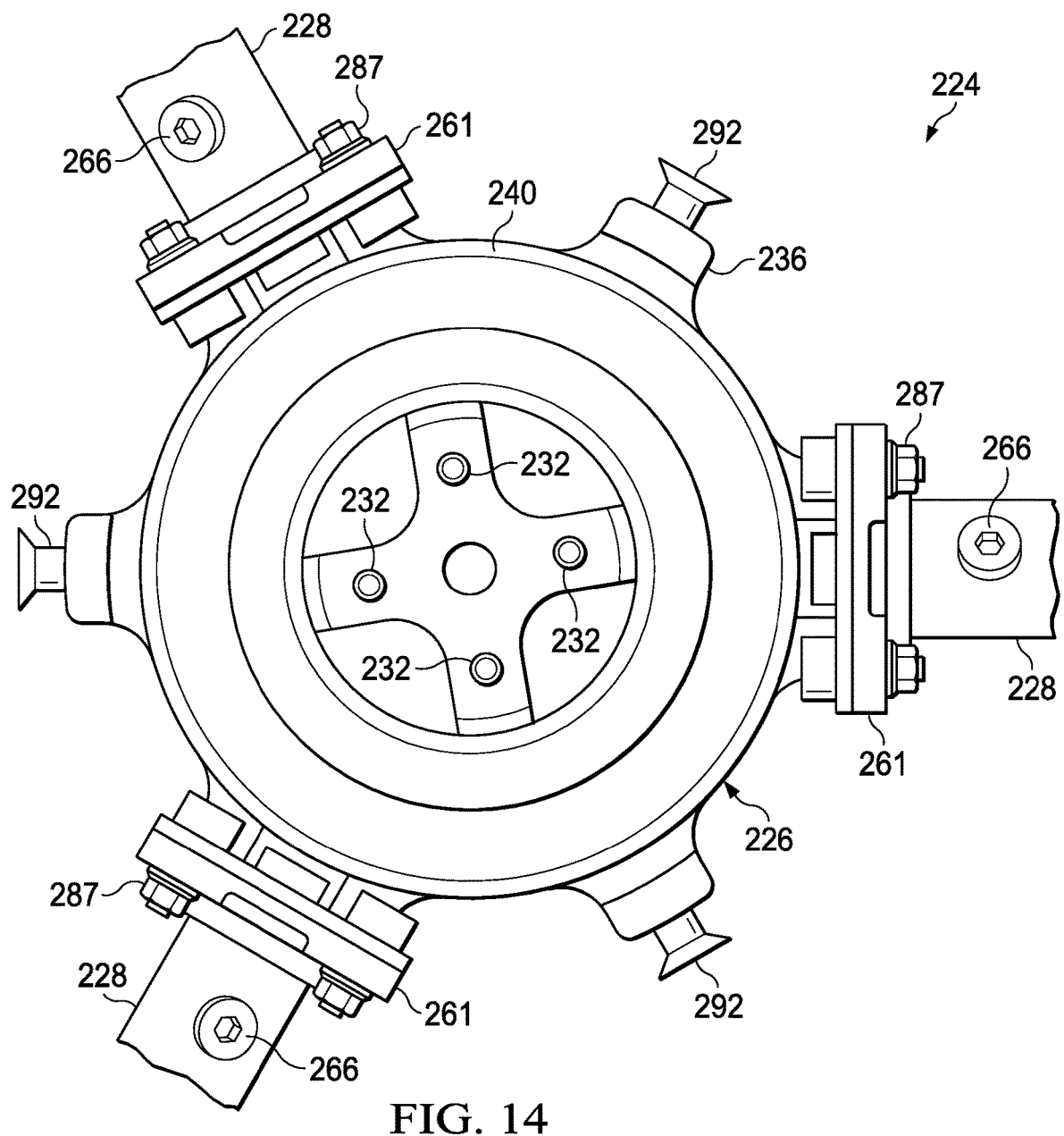
FIG. 14 is a bottom view of the variable-pitch rotor assembly of FIG. 12.

As shown in FIGS. 10-12, rotor assembly 224 includes a fairing 290 coupled to core 236 for common rotation therewith about rotor axis 248. Fairing 290 is coupled to core 236 via three screws 292.

The method of pitching rotor blades 228 is described below in the context of propulsion system 220 during a flight of UAV 200. FIG. 19A shows hub 226 with rotor blades 228 in the first position, with rotor blades 228 pitched at nine degrees, corresponding to the helicopter mode of UAV 200. Electronic speed controller 216 commands electric motor 222 to rotate, and electric motor 222 applies torque from driveshaft 234, through lower plate 240 to upper plate 238. Engagement of lower pawl 280 with second-position tooth 274 causes core 236 to rotate about rotor axis 248 in synchrony with upper plate 238 and lower plate 240. With rotor blades 228 in the first position, UAV 200 may take-off, hover, translate at low speed, and land. When high-speed translation is desired, a pitch-change is initiated by electronic speed controller 216 commanding electric motor 222 to rapidly slow, stop, or even momentarily reverse the output rotational velocity, thereby rapidly decreasing, ceasing, or reversing the torque applied to lower plate 240 and upper plate 238. However, while the decrease, cease, or reverse of torque applied to lower plate 240 causes rotation of upper plate 238 and lower plate 240 to slow down, stop, or reverse, the rotational inertia of core 236 and rotor blades 228 causes core 236 to continue rotating in the first direction 284 about rotor axis 248. Therefore, in response to the changed input of electric motor 222, core 236 rotates relative to upper plate 238 and lower plate 240. As core 236 rotates relative to lower plate 240, lower pawl 280 rides up the surface of first-position tooth 272 until lower pawl 280 clears the peak of first-position tooth 272. In order to prevent core 236 from rotating past the adjacent second-position tooth 274, upper pawl 282 may contact adjacent tooth 278. This contact between upper pawl 282 and tooth 278 arrests the relative rotation between core 236 and upper plate 238 and lower plate 240. Hub 226 is configured so that when upper pawl 282 is in contact with tooth 278, lower pawl 280 has cleared the peak of first-position tooth 272, at which point torsion spring 264 will push pitch horn 268 back towards lower plate 240 until lower pawl 280 is in contact with second-position tooth 274, resulting in rotor blades 228 assuming the fifteen-degree second position, as shown in FIG. 19B. At a point between initiating the pitch-change and lower pawl 280 engaging second-position tooth 274, electronic speed controller 216 commands electric motor 222 to increase output rotational velocity, thereby applying torque to lower plate 240, and causing core 236 to again rotate in synchrony therewith. With rotor blades 228 now pitched fifteen degrees, UAV 200 is optimized for high-speed translation. The pitch-change to the second position may be performed before, during, or after the transition of UAV 200 from helicopter mode to airplane mode.

When a return to low-speed translation is desired, the pitch-change procedure is simply repeated. That is, electronic speed controller 216 commands electric motor 222 to rapidly slow, stop, or even momentarily reverse the output rotational velocity, thereby rapidly decreasing, ceasing, or reversing the torque applied to lower plate 240. While the decrease, cease, or reverse of torque applied to lower plate 240 causes rotation of upper plate 238 and lower plate 240 to slow down, stop, or reverse, the rotational inertia of core 236 and rotor blades 228 causes core 236 to continue rotating in the first direction 284 about rotor axis 248. As core 236 rotates relative to lower plate 240, lower pawl 280 rides up the surface of second-position tooth 274 until lower pawl 280 clears the peak of second-position tooth 274. In order to prevent core 236 from rotating past the adjacent first-position tooth 272, upper pawl 282 may contact adjacent tooth 278. This contact between upper pawl 282 and tooth 278 arrests the relative rotation between core 236 and upper plate 238 and lower plate 240. At this point, torsion spring 264 will push pitch horn 268 back towards lower plate 240 until lower pawl 280 is in contact with first-position tooth 272, resulting in rotor blades 228 assuming the nine-degree first position, as shown in FIG. 19A. At a point between initiating the pitch-change and lower pawl 280 engaging first-position tooth 272, electronic speed controller 216 commands electric motor 222 to increase output rotational velocity, thereby applying torque to lower plate 240, and causing core 236 to again rotate in synchrony therewith. With rotor blades 228 now pitched nine degrees, UAV 200 is optimized for low-speed translation. The pitch-change back to the first position may be performed before, during, or after the transition of UAV 200 from airplane mode to helicopter mode.

The duration of the pitch-change, and therefore, the amount of time that electric motor 222 reduces, ceases, or reverses the torque applied, may be adjusted by varying the force applied by friction-slip clutch 254. That is, rotating adjustment screws 258 may cause faster or slower relative rotation between core 236 and lower plate 240, necessitating a shorter or longer period of torque interruption, respectively. However, the larger force applied by friction-slip clutch 254, the less likely it is that hub 226 will experience inadvertent relative movement between core 236 and lower plate 240, resulting in undesired blade pitching caused simply by changes in torque input from electric motor 222 that were only intended to change thrust output.

Ceasing the application of torque to a vertically oriented rotor on an aircraft during flight for anything longer than a fraction of a second is not advisable. Accordingly, the implementation of the pitch-change procedure and apparatus disclosed herein is preferably implemented using an input that may be rapidly changed. As such, while they may be implemented utilizing a gas motor and a clutch system and/or braking system, they are particularly well suited for use with small, low rotational inertia motors, such as a brushless direct current motor. For example, a brushless direct current motor may be capable of rotating at over one-thousand revolutions per minute, stopping, and resuming rotating at over one-thousand revolutions per minute in a fraction of a second. In addition, the capability to command a brushless direct current motor to perform this rapid stop/start procedure is already included in most standard electronic speed controllers. In addition to electric motors, pneumatic and hydraulic motors may also be well-suited for the task.

As mentioned above, hubs 126 and 226 may include any number of different teeth depths configured to produce different blade angles. For example, lower ratcheted surfaces 170 and 270 may include five different teeth depths sequentially ordered from the lowest pitch angle to the highest and then sequentially ordered back down to the lowest. As UAVs 100 and 200 increase their translational velocity, the blade pitches are progressively increased through sequential pitch-changes, similar to shifting the gears of an automobile. And when UAVs 100 and 200 decrease their translational velocity, the blade pitches are progressively, decreased through sequential pitch-changes. If a drastic acceleration justifies skipping directly from the lowest blade angle to the steepest, or vice versa, the speed of the pitch-change procedure allows it to be immediately repeated multiple times without materially effecting the flight. Moreover, the pitch-change procedure may be an automated function of an onboard flight control system that includes sensors and a flight control computer that determine the optimal blade pitch for the current conditions and automatically initiates the pitch-change procedure the appropriate number of times to acquire the optimal blade angle.

In addition, an onboard flight control system may be utilized to compute the real-time rotational inertia of cores 136 and 236, and with the amount of pressure applied by friction-slip clutches 154 and 254 known, calculate the exact amount of time required to impart the correct amount of relative rotation between cores 136 and 236 and lower plates 140 and 240. This capability would eliminate the need for upper plates 138 and 238, which limit the relative rotation to one tooth at time and would provide the ability to skip directly from the lowest blade angle to steepest in one pitch-change procedure rather than sequentially.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A method of pitching rotor blades, comprising:
   applying torque to a hub to rotate the hub about an axis;
   disposing a pawl between an upper plate and a lower plate, the pawl being configured to selectively engage each of the upper plate and the lower plate; and
   decreasing the torque applied to the hub;
   wherein the decreasing the torque causes a change in engagement between the pawl and at least one of the upper plate and lower plate thereby causing rotation of a plurality of rotor blades about their respective pitch-change axes from a first angle to a second angle;
   increasing the torque to the hub after the decreasing the torque applied to the hub;
   after the increasing the torque to the hub, decreasing the torque again;
   wherein the decreasing the torque again causes rotation of the plurality of rotor blades about their respective pitch-change axes from the second angle to the first angle.

* * * * *